(12) United States Patent
Tashiro

(10) Patent No.: US 11,292,669 B2
(45) Date of Patent: Apr. 5, 2022

(54) CONVEYING APPARATUS

(71) Applicant: MAZDA MOTOR CORPORATION, Hiroshima (JP)

(72) Inventor: Manabu Tashiro, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/161,494

(22) Filed: Jan. 28, 2021

(65) Prior Publication Data

US 2021/0245963 A1 Aug. 12, 2021

(30) Foreign Application Priority Data

Feb. 10, 2020 (JP) .............................. JP2020-020447

(51) Int. Cl.
*B65G 43/06* (2006.01)

(52) U.S. Cl.
CPC .................................... *B65G 43/06* (2013.01)

(58) Field of Classification Search
CPC ...................................................... B65G 43/06
USPC ............ 198/464.1, 465.4, 502.4, 678.1, 687, 198/810.02
See application file for complete search history.

(56) References Cited

U.S. PATENT DOCUMENTS

| | | | | |
|---|---|---|---|---|
| 4,863,006 A * | 9/1989 | Kotkata | ................ | B66B 29/005 198/323 |
| 5,136,971 A * | 8/1992 | Blankemeyer | ...... | B05B 13/0235 118/324 |
| 5,526,256 A * | 6/1996 | Sakata | ................... | B66B 25/00 700/79 |
| 7,357,240 B2 * | 4/2008 | Ogimura | ............... | B66B 23/028 198/330 |
| 7,694,803 B1 * | 4/2010 | Call | ....................... | B65G 39/20 198/680 |
| 8,800,743 B2 * | 8/2014 | Berger | .................... | B66B 23/14 198/322 |
| 9,216,861 B2 * | 12/2015 | Adachi | ............. | B65H 23/0326 |
| 10,294,080 B2 * | 5/2019 | Lustenberger | ........ | B66B 5/0018 |

FOREIGN PATENT DOCUMENTS

| | | |
|---|---|---|
| JP | 2009184481 A | 8/2009 |
| JP | 2009262592 A | 11/2009 |

* cited by examiner

*Primary Examiner* — Douglas A Hess
(74) *Attorney, Agent, or Firm* — Studebaker & Brackett PC

(57) ABSTRACT

When a conveyance abnormality occurs in a driving conveyor, runaway of a conveying member that supports a conveyance object is stopped. An endless conveyor is provided with a plurality of the conveying members spaced apart from each other, and an endless element is provided with a plurality of engaging members spaced apart from each other and engaged with the conveying members from the conveyance direction, in which the endless element receives a driving force with the engaging member from the conveyor via the conveying member to thereby travel. When the conveyance abnormality in which the conveying member travels autonomously is detected, the endless element is stopped by giving of a braking force, and the runaway of the conveying member is stopped by the engaging member.

8 Claims, 5 Drawing Sheets

CONVEYING APPARATUS

BACKGROUND

Technical Field

The present disclosure relates to a conveying apparatus that conveys a vehicle body or the like.

Background Art

In a conveying apparatus in which a conveyance object is placed on a conveying member and conveyed by an endless conveyor such as a driving chain, for example, an overhead conveying apparatus used for conveyance of a vehicle body or the like, when the driving chain that gives a conveyance force is cut, the conveying member on which the conveyance object is placed may run away. For example, at an area where the conveyance object is diagonally lowered from a storage line at a high position to a work station at a low position, there is a concern that when the driving chain is cut, the conveying member on which the conveyance object is placed may travel due to the self-weight thereof and run away.

An example of the technology for preventing such runaway of the conveying member is described in Japanese Patent Laid-Open No. 2009-262592. Specifically, in an overhead conveying apparatus, when the runaway of the conveying member is detected, a stopper is caused to protrude into a track rail through which a carriage wheel passes, and hits the wheel, thereby stopping advancement of the carriage. Another example of the runaway prevention technology is described in Japanese Patent Laid-Open No. 2009-184481. Specifically, when the runaway of the conveying member is detected, a stopper is caused to protrude in front of a trolley, thereby stopping advancement of the trolley.

Furthermore, it has also been known that an endless runaway prevention chain is disposed on a downward inclined portion of a conveyance line for the conveyance object in parallel therewith, a number of engaging members are provided in the chain so as to be spaced apart from each other, and this engaging member is engaged with a locking arm provided in the conveying member, thereby preventing the runaway of the conveying member. In the runaway prevention technology of this chain type, the runaway prevention chain is driven by dedicated driving means so as to travel at a speed slightly larger than the conveyance speed of the conveying member. Each of the engaging members, when hitting the locking arm, pivots and retracts, and passes the locking arm. If the speed of the conveying member is increased by the runaway, the locking arm of the conveying member hits and presses the engaging member of the runaway prevention chain, and detection of this stops the runaway prevention chain.

SUMMARY

In the runaway prevention technology of the above-described stopper type, it is necessary for all areas where the runaway of the conveying member of the conveyance line may occur to be provided with a stopper and operation means thereof, thus increasing the equipment cost. In addition, the runaway of the conveying member does not stop until the carriage wheel or the trolley hits the stopper. Accordingly, for example, to stop the conveying member while securing a safety distance between the conveyance object and a worker, it is necessary to increase the number of stoppers and shorten intervals thereof.

Even in a case of the runaway prevention technology of the chain type, the runaway does not stop until the locking arm on the conveying member side hits a locking piece of the runaway prevention chain. Accordingly, to secure the safety distance, it is necessary to increase the number of locking pieces. Furthermore, dedicated driving means for causing the runaway prevention chain to travel is required, and in a case where the conveyance speed of the conveyance object is changed, an inverter for accordingly changing the speed of the runaway prevention chain is required. Furthermore, the locking piece of the runaway prevention chain, when passing the locking arm on the conveying member side, hits the locking arm and performs pivotal retraction and pivotal return, thus causing a problem of an increase in noise.

Thus, the present embodiments operate to, when a conveyance abnormality occurs in a driving conveyor, immediately stop a conveying member that supports a conveyance object, reduce the equipment cost, and reduce the noise.

According to the present disclosure, dedicated driving means is not provided in an endless element for runaway prevention which is provided along a conveyance line. The endless element travels by being pressed by a conveying member, and when a traveling abnormality occurs in a conveyor, the endless element is braked and runaway of the conveying member is stopped.

Namely, a conveying apparatus disclosed herein is characterized by including an endless conveyor provided with a plurality of conveying members. The plurality of conveying members are spaced apart from each other and each supporting a conveyance object, and the endless conveyor is driven to convey the conveyance object. The conveying apparatus further includes an endless element provided with a plurality of engaging members. The plurality of engaging members are spaced apart from each other and engaged with the conveying members from a conveyance direction of the conveyance object. The endless element has a wayside portion extending along a conveyance line for the conveyance object by means of the conveyor, and the endless element receives a driving force with the engaging member from the conveyor via the conveying member at the wayside portion to thereby travel. The conveying apparatus also includes conveyance abnormality detection means that detects a conveyance abnormality in which the conveying member travels autonomously irrespective of the conveyor, and a brake apparatus that gives a braking force to traveling of the endless element when the conveyance abnormality detection means detects the conveyance abnormality.

According to this, the endless element receives the driving force with the engaging member from the conveyor via the conveying member, namely, the engaging member is pressed by the conveying member, and thereby the endless element travels. Accordingly, dedicated driving means for causing the endless element to travel is not required. Thus, in a state where the conveying member of the conveyor engages with the engaging member, the endless element travels in synchronization with the conveyor, so that if the endless element is forced to stop, the conveying member engaging with the engaging member stops simultaneously with the stop of the endless element. Accordingly, when the conveyance abnormality of the conveyor, namely, the autonomous traveling of the conveying member, is detected, if the braking force is applied to the endless element, traveling of the conveying member engaging with the engaging member is suppressed instantaneously, so that the runaway of the conveying member can be stopped immediately.

Furthermore, the engaging member of the endless element does not pass the conveying member on the conveyor side, so that passing noise of the engaging member which has been generated in a conventional chain type no longer occurs. Furthermore, dedicated driving means is not required for the endless element, and there is no need for causing the endless element to travel at a speed slightly larger than the speed of the conveyor, so that it is advantageous in reducing the equipment cost.

Here, if the conveying member travels autonomously and thereby the speed thereof is increased, the traveling speed of the endless element exceeds the traveling speed of the conveyor, so that the conveyance abnormality can be detected by monitoring a traveling speed difference between the two.

Furthermore, the conveying member is brought into a state of traveling autonomously, at the time of cutting of the conveyor or disengagement from the conveyor. At that time, a load applied to conveyor driving means during conveyance of the conveying member is reduced. Accordingly, the conveyance abnormality (the autonomous traveling of the conveying member) can be detected based on, for example, a change in the load. Alternatively, the cutting of the conveyor leads to a reduction in tension of the conveyor, so that the conveyance abnormality can be detected based on the reduction in the tension thereof.

In an embodiment, the conveyance line for the conveyance object by means of the conveyor includes a downward inclined portion that lowers the conveyance object, and the wayside portion of the endless element extends along the downward inclined portion. Accordingly, the runaway of the conveying member at the downward inclined portion at the time of occurrence of the conveyance abnormality (the autonomous traveling of the conveying member) can be stopped effectively and immediately.

In an embodiment, the conveyor and the endless element are disposed in parallel so that the endless element travels on a side of the conveyor. Accordingly, the conveyor and the endless element can be arranged compactly, facilitating the equipment layout.

In an embodiment, the plurality of engaging members are provided in the endless element at pitches substantially corresponding to disposition pitches of the conveying members in the conveyor. Accordingly, when the braking force is given to the endless element, all the conveying members disposed in the conveyance direction at the wayside portion of the endless element are engaged with the corresponding engaging members instantaneously or with slight move, and thereby traveling thereof can be suppressed. Accordingly, it is advantageous in stopping runaway of the conveyance object while securing a safety distance between a worker and a work machine.

In an embodiment, provided is traveling abnormality detection means that detects a traveling abnormality of the endless element, wherein the conveyor is stopped when this traveling abnormality detection means detects the traveling abnormality of the endless element.

If the traveling abnormality occurs in which the endless element does not travel smoothly, traveling of the conveying member caused by the conveyor is suppressed by the engaging member of the endless element, thus applying an overload to the conveyor side. Thus, when the traveling abnormality of the endless element is detected, the conveyor is stopped.

According to the present disclosure, provided is the endless element having the wayside portion extending along the conveyance line of the conveyor. The endless element receives the driving force with the engaging member from the conveyor via the conveying member to thereby travel, and when the conveyance abnormality in which the conveying member travels autonomously irrespective of the conveyor is detected, the braking force is given to the traveling of the endless element, so that when the conveying member travels autonomously, the runaway thereof can be stopped immediately, and it is also advantageous in reducing the noise and the equipment cost.

DETAILED DESCRIPTION

Hereinafter, a mode for carrying out the present disclosure will be described based on the drawings. The following description of a preferred embodiment is merely illustrative in nature and is not intended to limit the present disclosure, applications thereof, or use thereof.

Figure 1:
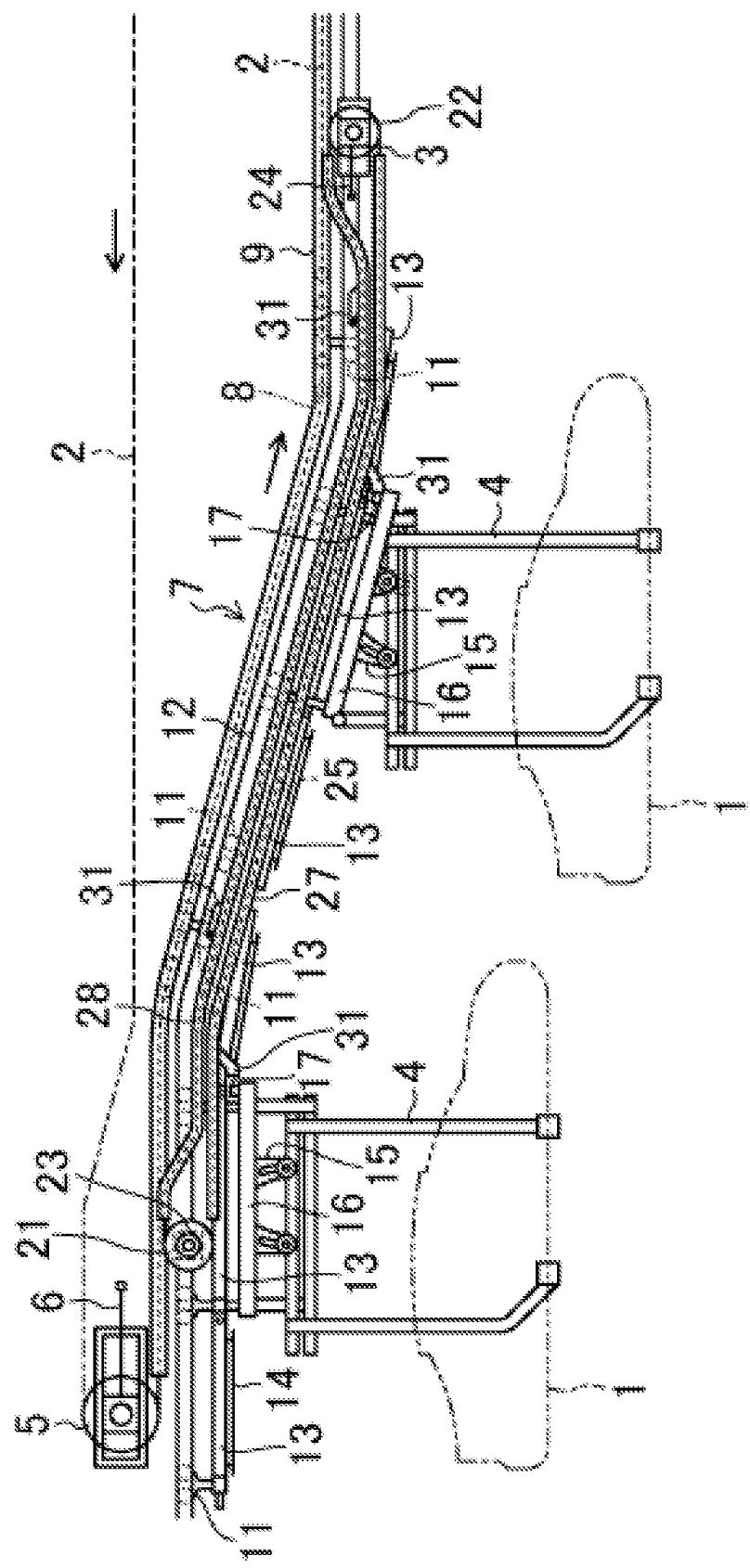
FIG. 1 is a side view showing a conveying apparatus.

A conveying apparatus shown in FIG. 1 is an overhead conveying apparatus that conveys a vehicle body 1 as a conveyance object so that the vehicle body 1 travels to each work station where, for example, various vehicle components are assembled or vehicle body painting is performed. In the same figure, reference numeral 2 denotes a chain (hereinafter referred to as a "conveyor chain") as an endless conveyor for vehicle body conveyance, reference numeral 3 denotes a runaway prevention chain as an endless element for preventing runaway of a conveying member, and reference numeral 4 denotes a hanger as the conveying member that supports the vehicle body 1. The conveying apparatus is provided with a number of the hangers 4 spaced apart from each other in the conveyance direction.

Conveying Means for Conveyance Object

The conveyor chain 2 is wound around a driving sprocket (illustration omitted) and a driven sprocket 5. Rotation of the driving sprocket caused by conveyor driving means (electric motor) causes the conveyor chain 2 to travel. The driven sprocket 5 is provided with a take-up apparatus 6. A conveyance line for the vehicle body 1 is provided with a downward inclined portion 7 that lowers the vehicle body 1 from a storage line to the work station. The conveyor chain 2 is a chain with a side roller. Along the conveyance line, a guide rail 9 is provided which rolls a side roller 8 of the conveyor chain 2 to guide traveling of the conveyor chain 2 in the vehicle body conveyance direction.

On the lower side of the guide rail 9, a traveling rail 12 that guides a trolley 11 for conveyance is provided along the guide rail 9. Each of the hangers 4 is supported on the traveling rail 12 by the trolley 11 via a load bar 13. The load bar 13 supporting the hanger 4 is connected to the front-side load bar 13 and the rear-side load bar 13. An oil pan 14 is supported on the front and rear load bars 13.

The first trolley 11 supporting the front-side load bar 13 is connected to a pusher protruding downward from a chain link of the conveyor chain 2, and thereby a conveyance force is given to the hanger 4. The hanger 4 is provided with a horizontal holding mechanism 15 for keeping a horizontal state of the vehicle body 1 at the downward inclined portion 7 and upward inclined portion of the conveyance line. A front end of an upper frame 16 of the hanger 4 is provided with an engaging claw 17 protruding upward for being engaged with an engaging member 31 of the runaway prevention chain 3 which will be described later.

Runaway Prevention Chain

The runaway prevention chain 3 is wound around two sprockets 21 and 22 disposed on the proximal side of the downward inclined portion 7 and on the leading side of the downward inclined portion 7 in the vehicle body conveyance direction. The sprockets 21 and 22 are freely rotating sprockets, and the runaway prevention chain 3 is not provided with dedicated driving means. The proximal-side sprocket 21 is provided with a brake apparatus 23 that gives a braking force to rotation of the sprocket 21, namely, that gives a braking force to traveling of the runaway prevention chain 3. The leading-side sprocket 22 is provided with a take-up apparatus 24.

The runaway prevention chain 3 has an inclined wayside portion 25 extending so as to cause the chain to travel along the downward inclined portion 7 in the vehicle body conveyance direction. The conveyor chain 2 and the runaway prevention chain 3 are disposed in parallel so that the runaway prevention chain 3 travels on the side of the conveyor chain 2 at the inclined wayside portion 25.

Figure 2:
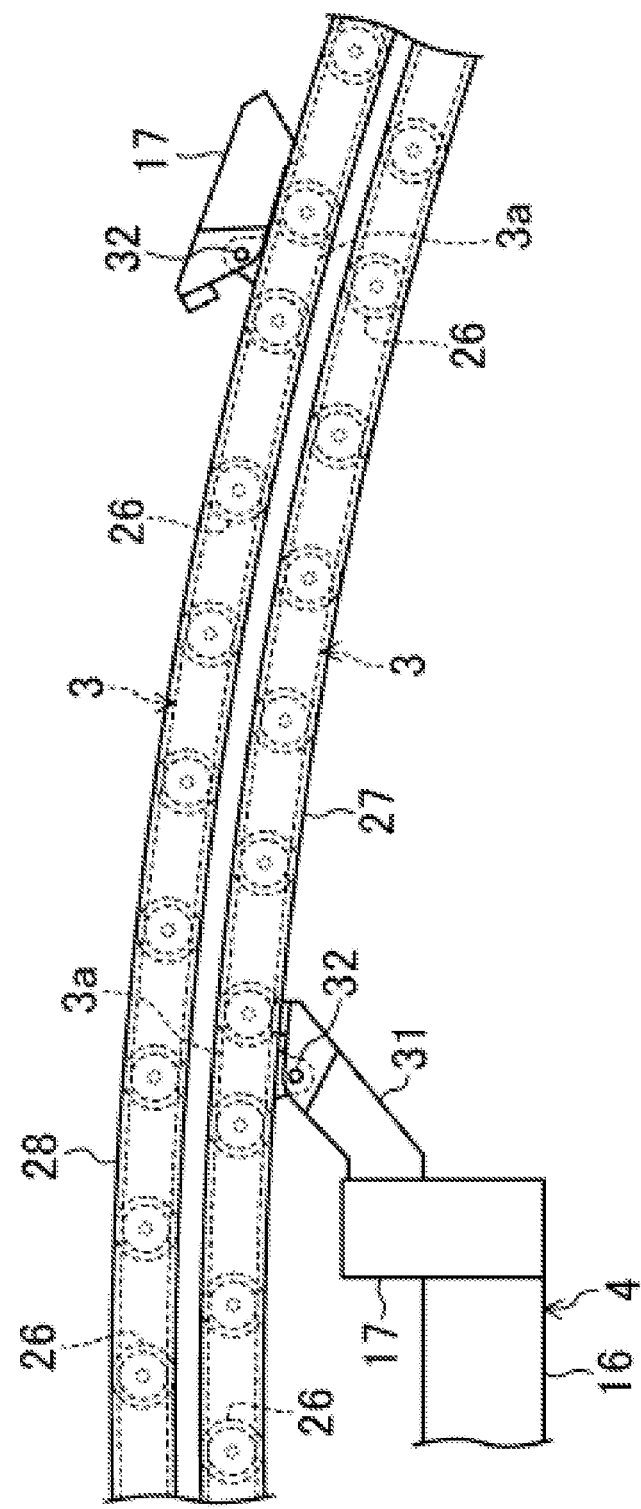
FIG. 2 is a side view showing a runaway prevention chain and a guide rail thereof.

As shown in FIG. 2, the runaway prevention chain 3 is a chain with a side roller. The runaway prevention chain 3 is provided with a conveyance-side guide rail 27 and a return-side guide rail 28 which roll a side roller 26 of the runaway prevention chain 3 to guide traveling of the runaway prevention chain 3. As shown in FIG. 1, the guide rails 27 and 28 extend along the downward inclined portion 7 so as to connect the sprockets 21 and 22. The conveyance-side guide rail 27 guides so that the runaway prevention chain 3 travels downward along the downward inclined portion 7 in the vehicle body conveyance direction. The return-side guide rail 28 guides so that the runaway prevention chain 3 travels upward along the downward inclined portion 7.

As shown in FIG. 2, the runaway prevention chain 3 is provided with a plurality of the engaging members 31 spaced apart from each other in the vehicle body conveyance direction and engaged with the engaging claws 17 at an upper end of the hanger 4 from the vehicle body conveyance direction. As shown in FIG. 1, the engaging members 31 are disposed at pitches substantially corresponding to disposition pitches of the hangers 4 in the conveyor chain 2.

As shown in FIG. 2, the engaging member 31 is rotatably supported on a chain link 3a by a horizontal pin 32 orthogonal to the vehicle body conveyance direction, in a pivotable manner. The engaging member 31, when on the conveyance side in which the runaway prevention chain 3 travels in the vehicle body conveyance direction, protrudes downward due to the self-weight and is located at an engagement position at which the engaging claw 17 of the hanger 4 engages therewith. A base end of the engaging member 31 is provided with a stopper 33 that hits the runaway prevention chain 3 and holds the engaging member 31 at the engagement position. On the return side of the runaway prevention chain 3, the engaging member 31 is in a state of lying down on the runaway prevention chain 3.

Brake Apparatus

Figure 3:
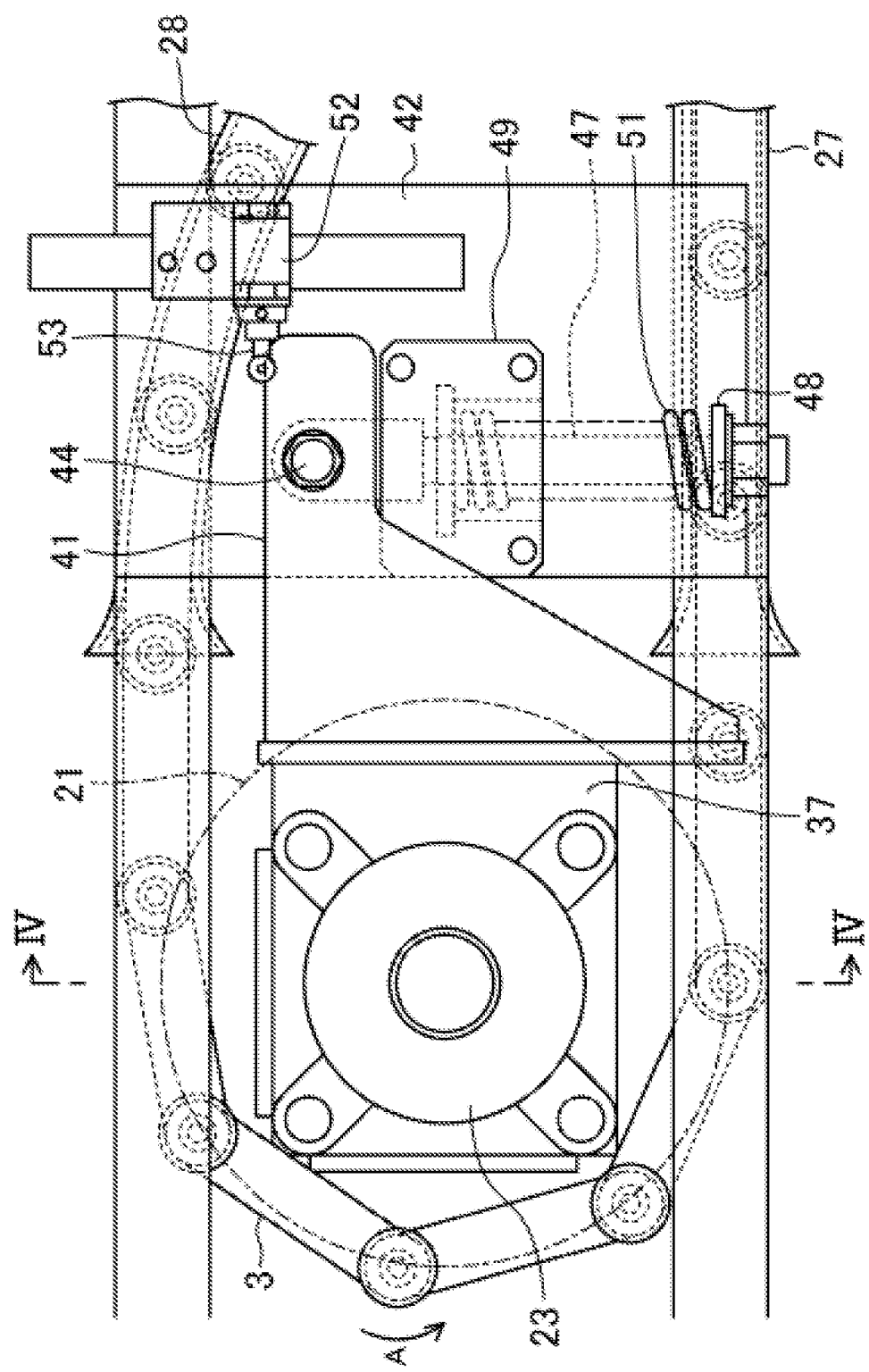
FIG. 3 is a side view showing a support structure of a brake apparatus of the runaway prevention chain.
Figure 4:
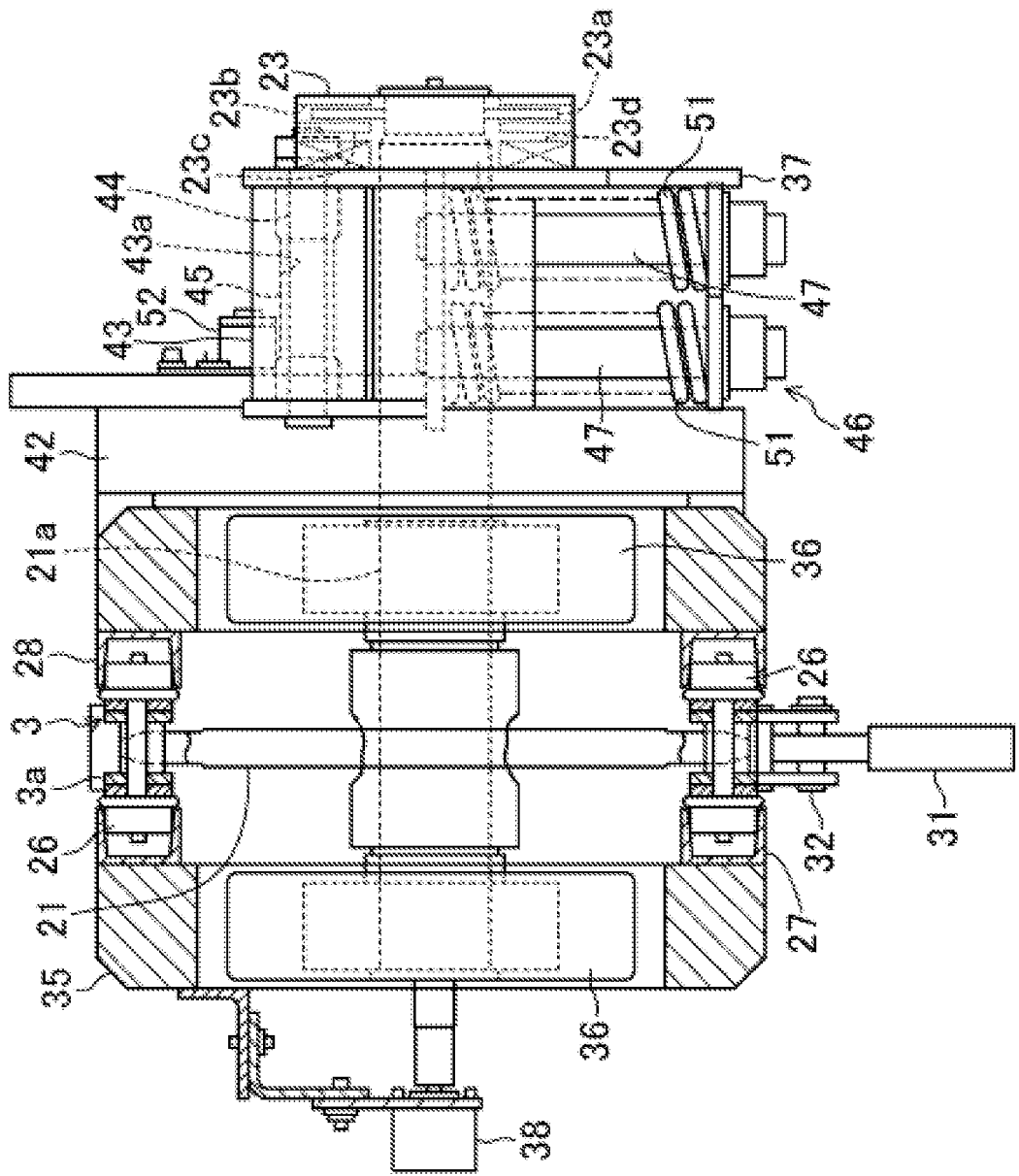
FIG. 4 is a cross-sectional view taken along line IV-IV in FIG. 3.

As shown in FIGS. 3 and 4, the proximal-side sprocket 21 of the runaway prevention chain 3 has a shaft 21a supported on a machine frame 35 by a bearing 36 in a rotatable manner. The brake apparatus 23 is supported on a brake support plate 37 fitted to the shaft 21a on the side of the machine frame 35 in a rotatable manner.

The brake apparatus 23 is of a non-excited operation type and includes a disk 23a that rotates integrally with the shaft 21a, an armature 23c that presses the disk 23a against a plate 23b to generate the braking force, a spring (illustration omitted) that biases the armature 23c in a direction in which the armature 23c is pressed against the disk 23a, and an electromagnetic coil 23d for releasing the armature 23c from the disk 23c against the biasing of the spring.

When a power for energizing the electromagnetic coil 23d is turned on, the armature 23c is attracted to the electromagnetic coil 23d and the disk 23a is released, so that the brake apparatus 23 is brought into a non-operation state and does not exert the braking force on the proximal-side sprocket 21. When the power is turned off, the biasing of the spring causes the armature 23c to press the disk 23a against the plate 23b. Rotation of the disk 23a is thereby suppressed, so that the braking force is given to the proximal-side sprocket 21. Namely, the brake apparatus 23 is brought into an operation state.

Rotary Encoder

On the opposite side of the brake apparatus 23 across the proximal-side sprocket 21 in the machine frame 35, a rotary encoder 38 is supported which detects a rotation position (rotation angle) of the proximal-side sprocket 21. This encoder 38 is for detecting a conveyance abnormality in which the hanger 4 travels autonomously (runs away) irrespective of the conveyor chain 2, which will be described later.

Support Structure of Brake Apparatus

Support of the brake support plate 37 will be described. The brake support plate 37 is not fixed to the machine frame 35. As shown in FIG. 3, an extension plate 41 extending from the brake support plate 37 to the downward inclined portion 7 side is supported on a fixed support plate 42 fixed to the machine frame 35, in a movable manner in the up-down direction.

Namely, a support hole 43a parallel to the shaft 21a is formed in a support 43 provided at the fixed support plate 42. A support pin 44 is passed through this support hole 43a. A rubber bush 45 is fitted between an inner peripheral face of the support hole 43a and the support pin 44, and the support pin 44 is movable in the up-down direction in the support hole 43a. The extension plate 41 extending from the brake support plate 37 is fixed to this support pin 44. Furthermore, the fixed support plate 42 is provided with biasing means 46 that biases the support pin 44 downward.

The biasing means 46 includes a rod 47 coupled to the support pin 44 and extending downward, and a compression spring 51 interposed between a lower spring receiver 48 at a lower end of the rod 47 and an upper spring receiver 49 fixed to the fixed support plate 42. The support pin 44 is biased downward by the compression spring 51 via the rod 47. Thereby, the extension plate 41 integrated with the brake support plate 37 is biased so as to rotate around the shaft 21*a* of the proximal-side sprocket 21 in a direction opposite to a rotation direction A of the proximal-side sprocket 21 and is held in a state where the lower half peripheral side of the rubber bush 45 is compressed by using the lower half peripheral side of the inner peripheral face of the support hole 43*a* of the support 43 as a stopper.

Limit Switch

A limit switch 52 is supported on the fixed support plate 42. An end of the extension plate 41 integrated with the brake support plate 37 is in contact with a roller lever 53 of the limit switch 52 from the rotation direction A side of the proximal-side sprocket 21.

Here, when the brake apparatus 23 is in a normal non-operation state, the proximal-side sprocket 21 rotates without receiving the braking force from the brake apparatus 23, and accordingly the runaway prevention chain 3 also travels smoothly. In contrast, if the brake apparatus 23 is brought into a state of giving the braking force to the proximal-side sprocket 21 due to some cause, the runaway prevention chain 3 is less likely to travel smoothly. Meanwhile, this runaway prevention chain 3 receives a traveling force of the conveyor chain 2 via the hanger 4 and thus attempts to rotate the proximal-side sprocket 21. Accordingly, a rotation force thereof is transmitted to the brake support plate 37 via the brake apparatus 23. Therefore, the brake support plate 37 rotates in the rotation direction A of the proximal-side sprocket 21 together with the extension plate 41 against the biasing of the compression spring 51. As a result, the extension plate 41 pivots the roller lever 53 of the limit switch 52, and an ON signal is issued from the limit switch 52.

Controller

Figure 5:
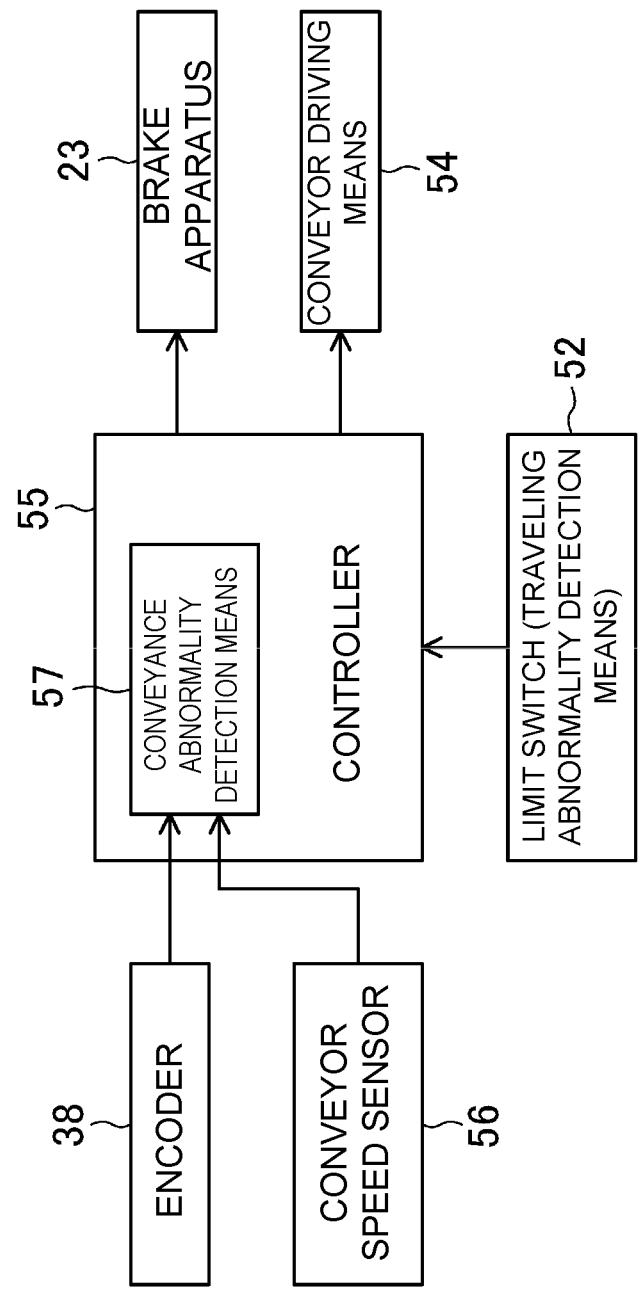
FIG. 5 is a block diagram of a control system.

As shown in FIG. 5, the encoder 38 and the limit switch 52 are connected to a controller 55 which includes a microcomputer that controls operations of the brake apparatus 23 and conveyor driving means 54. Furthermore, the conveying apparatus includes a conveyor speed sensor 56 that detects the traveling speed of the conveyor chain 2.

A detection signal of each of the conveyor speed sensor 56 and the encoder 38 is input to conveyance abnormality detection means 57 of the controller 55. The conveyance abnormality detection means 57 calculates the speed of the runaway prevention chain 3 based on the detection signal of the encoder 38 and, when the traveling speed of the runaway prevention chain 3 exceeds the traveling speed of the conveyor chain 2, determines that the hanger 4 has started running away due to autonomous traveling, outputting a detection signal for the conveyance abnormality.

The controller 55, at the time of conveyance of the vehicle body 1, while outputting to the conveyor driving means 54 a signal for operating the conveyor chain 2, outputs to the brake apparatus 23 a brake release signal (coil power-on). The controller 55, at the time of stop of conveyance of the vehicle body 1, while outputting to the conveyor driving means 54 a signal for stopping the driving of the conveyor chain 2, outputs to the brake apparatus 23 an operation signal (coil power-off).

The controller 55, when the detection signal for the conveyance abnormality is issued, outputs to the brake apparatus 23 the operation signal (coil power-off) and outputs to the conveyor driving means 54 the signal for stopping the driving of the conveyor chain 2. Furthermore, the controller 55, when receiving the ON signal of the limit switch 52, determines that an abnormality has occurred in the traveling of the runaway prevention chain 3, and outputs to the conveyor driving means 54 the signal for stopping the driving of the conveyor chain 2.

The time at which the ON signal is issued from the limit switch 52 is when an abnormality occurs in the traveling of the runaway prevention chain 3 due to operation or failure of the brake apparatus 23. Accordingly, the limit switch 52 configures traveling abnormality detection means of the runaway prevention chain 3.

Operation of Conveying Apparatus

The trolley 11 travels on the traveling rail 12 due to the driving of the conveyor chain 2, and thereby the hanger 4 on which the vehicle body 1 is placed goes down the downward inclined portion 7 from the storage line to move to the work station. Although the runaway prevention chain 3 does not include dedicated driving means, the engaging claw 17 at the upper end of the hanger 4 engages with the engaging member 31 of the runaway prevention chain 3 from the conveyance direction, and the runaway prevention chain 3 is thereby pressed by the hanger 4 and travels in synchronization with the conveyor chain 2.

If the hanger 4 is brought into a state of traveling autonomously on the traveling rail 12 by, for example, cutting of the conveyor chain 2 or disengagement of the trolley 11 from the conveyor chain 2, there is a concern that the hanger 4 may run away at the downward inclined portion 7 of the conveyance line. In contrast, in the conveying apparatus, the runaway prevention chain 3 is pressed by the hanger 4 and travels. Accordingly, if the hanger 4 starts running away and the traveling speed of the runaway prevention chain 3 exceeds the traveling speed of the conveyor chain 2, the fact, namely, the runaway, is detected by the conveyance abnormality detection means 57 via the encoder 38, and the operation signal is output to the brake apparatus 23. Namely, the coil power is turned off. Thereby, the brake apparatus 23 is operated and the braking force is given to the proximal-side sprocket 21, stopping the traveling of the runaway prevention chain 3.

Since the engaging member 31 of the runaway prevention chain 3 is pressed by the engaging claw 17 of the hanger 4 and thereby the runaway prevention chain 3 travels, if the runaway prevention chain 3 is given the braking force from the brake apparatus 23 and stops, the engaging member 31 of the runaway prevention chain 3 serves as a stopper and the hanger 4 also stops simultaneously. Furthermore, since the engaging members 31 of the runaway prevention chain 3 are disposed at the pitches substantially corresponding to the disposition pitches of the hangers 4, all the hangers 4 present at the downward inclined portion 7 stop almost simultaneously with the stop of the runaway prevention chain 3. Accordingly, even in a case where a worker is present at the work station, the hanger 4 can be stopped while keeping a safety distance at which the hanger 4 or the vehicle body 1 is not in contact with the worker.

Furthermore, at the time of the runaway of the hanger 4, the brake apparatus 23 is brought into the operation state, and the driving of the conveyor chain 2 stops. This can avoid an unexpected situation due to continuous traveling of the conveyor chain 2 in a state where the conveyance abnormality has occurred.

Next, even in a case where no conveyance abnormality occurs on the conveyor chain 2 side, when a traveling abnormality occurs in the runaway prevention chain 3, the fact is detected by the limit switch 52. For example, it is when the runaway prevention chain 3 no longer travels smoothly after the coil power of the brake apparatus 23 is accidentally turned off or the brake apparatus 23 is brought into a state of giving the braking force to the proximal-side sprocket 21 due to, for example, catching of foreign material.

Since the engaging claw 17 of the hanger 4 engages with the engaging member 31 of the runaway prevention chain 3, in a case where the runaway prevention chain 3 does not travel smoothly, there is a concern that the traveling load of the conveyor chain 2 may be increased, causing cutting thereof, or that driving means (electric motor) 58 thereof may receive an unallowable load, causing failure such as seizure.

In contrast, in the conveying apparatus, when the traveling abnormality occurs in the runaway prevention chain 3 due to an abnormality of the brake apparatus 23, a force of the runaway prevention chain 3 to cause the proximal-side sprocket 21 to rotate is transmitted to the brake support plate 37 via the brake apparatus 23. Therefore, the brake support plate 37 rotates in the rotation direction A of the proximal-side sprocket 21 together with the extension plate 41 against the biasing of the compression spring 51. As a result, the extension plate 41 pivots the roller lever 53 of the limit switch 52, and the ON signal is issued from the limit switch 52. Thereby, the stop signal is output to the conveyor driving means 54, and the traveling of the conveyor chain 2 stops. Accordingly, cutting of the conveyor chain 2 or failure of the conveyor driving means (electric motor) 54 can be avoided.

Note that the endless conveyor is not limited to the chain 2 and may be another endless member such as a belt or a cable.

Furthermore, the endless element for runaway prevention is not limited to the chain 3 and may be another endless member such as a cable.

Furthermore, the conveying member is also not limited to the hanger 4 and may be another conveying member such as a truck.

What is claimed is:

1. A conveying apparatus comprising:
an endless conveyor provided with a plurality of conveying members, the plurality of conveying members being spaced apart from each other and each supporting a conveyance object, the endless conveyor being driven to convey the conveyance object;
an endless element provided with a plurality of engaging members, the plurality of engaging members being spaced apart from each other and engaged with the conveying members from a conveyance direction of the conveyance object, the endless element having a wayside portion extending along a conveyance line for the conveyance object by the conveyor, the endless element receiving a driving force with the engaging member from the conveyor via the conveying member at the wayside portion to thereby travel;
a conveyor abnormality detector configured to detect a traveling abnormality of the conveyor; and
a brake apparatus configured to apply a braking force to traveling of the endless element when the conveyor abnormality detector detects the traveling abnormality of the conveyor; wherein
the conveyance line for the conveyance object by the conveyor comprises a downward inclined portion configured to lower the conveyance object,
the wayside portion of the endless element extends along the downward inclined portion;
the conveyor and the endless element are disposed in parallel so that the endless element travels on a side of the conveyor; and
the plurality of engaging members are provided in the endless element at pitches substantially corresponding to disposition pitches of the conveying members in the conveyor;
the conveying apparatus further comprising a traveling abnormality detector configured to detect a traveling abnormality of the endless element, wherein the conveyor is stopped when the traveling abnormality detector detects the traveling abnormality of the endless element.

2. The conveying apparatus according to claim 1, wherein the endless element includes a runaway prevention chain wound around two sprockets disposed on a proximal side of a downward inclined portion and on a leading side of the downward inclined portion in a vehicle body conveyance direction,
the sprocket on the proximal side includes a brake apparatus that applies the braking force to rotation of the sprocket on the proximal side that applies braking force to traveling of the runaway prevention chain, and
the sprocket on the leading side includes a take-up apparatus.

3. The conveying apparatus according to claim 1, wherein the conveyor abnormality detector includes a limit switch configured to generate an ON signal when an abnormality occurs in the traveling of the endless element due to operation or failure of the brake apparatus.

4. The conveying apparatus according to claim 3, wherein the endless element includes a runaway prevention chain wound around two sprockets disposed on a proximal side of a downward inclined portion and on a leading side of the downward inclined portion in a vehicle body conveyance direction,
the sprocket on the proximal side includes a brake apparatus that applies the braking force to rotation of the sprocket on the proximal side that applies braking force to traveling of the runaway prevention chain, and
the sprocket on the leading side includes a take-up apparatus.

5. A conveying apparatus comprising:
an endless conveyor provided with a plurality of conveying members, the plurality of conveying members being spaced apart from each other and each supporting a conveyance object, the endless conveyor being driven to convey the conveyance object;
an endless element provided with a plurality of engaging members, the plurality of engaging members being spaced apart from each other and engaged with the conveying members from a conveyance direction of the conveyance object, the endless element having a wayside portion extending along a conveyance line for the conveyance object by the conveyor, the endless element receiving a driving force with the engaging member from the conveyor via the conveying member at the wayside portion to thereby travel;
a conveyor abnormality detector configured to detect a traveling abnormality of the conveyor;
a brake apparatus configured to apply a braking force to traveling of the endless element when the conveyor abnormality detector detects the traveling abnormality of the conveyor; and a traveling abnormality detector configured to detect a traveling abnormality of the endless element, wherein the conveyor is stopped when the traveling abnormality detector detects the traveling abnormality of the endless element.

6. The conveying apparatus according to claim 5, wherein the plurality of engaging members are provided in the endless element at pitches substantially corresponding to disposition pitches of the conveying members in the conveyor.

7. A conveying apparatus comprising:

an endless conveyor provided with a plurality of conveying members, the plurality of conveying members being spaced apart from each other and each supporting a conveyance object, the endless conveyor being driven to convey the conveyance object;

an endless element provided with a plurality of engaging members, the plurality of engaging members being spaced apart from each other and engaged with the conveying members from a conveyance direction of the conveyance object, the endless element having a wayside portion extending along a conveyance line for the conveyance object by the conveyor, the endless element receiving a driving force with the engaging member from the conveyor via the conveying member at the wayside portion to thereby travel;

a conveyor abnormality detector configured to detect a traveling abnormality of the conveyor; and a brake apparatus configured to apply a braking force to traveling of the endless element when the conveyor abnormality detector detects the traveling abnormality of the conveyor;

wherein the conveyor abnormality detector includes a limit switch configured to generate an ON signal when an abnormality occurs in the traveling of the endless element due to operation or failure of the brake apparatus.

8. The conveying apparatus according to claim 7, wherein the endless element includes a runaway prevention chain wound around two sprockets disposed on a proximal side of a downward inclined portion and on a leading side of the downward inclined portion in a vehicle body conveyance direction, the sprocket on the proximal side includes a brake apparatus that applies the braking force to rotation of the sprocket on the proximal side that applies braking force to traveling of the runaway prevention chain, and the sprocket on the leading side includes a take-up apparatus.

\* \* \* \* \*